United States Patent [19]
Jochi

[11] Patent Number: 6,046,424
[45] Date of Patent: Apr. 4, 2000

[54] RESISTANCE WELDING CONTROL APPARATUS

[75] Inventor: Takashi Jochi, Chiba-ken, Japan

[73] Assignee: Miyachi Technos Corporation, Chiba-ken, Japan

[21] Appl. No.: 09/274,336

[22] Filed: Mar. 23, 1999

[30] Foreign Application Priority Data

Apr. 2, 1998 [JP] Japan .................................. 10-107027

[51] Int. Cl.$^7$ ................................................. B23K 11/24
[52] U.S. Cl. ........................................................... 219/110
[58] Field of Search ................................. 219/110, 108, 219/109

[56] References Cited

U.S. PATENT DOCUMENTS

| | | | |
|---|---|---|---|
| 4,973,814 | 11/1990 | Kojima et al. ........................ | 219/110 |
| 5,237,147 | 8/1993 | Pazzaglia ................................ | 219/108 |
| 5,406,045 | 4/1995 | Kiriishi et al. ........................ | 219/110 |
| 5,489,757 | 2/1996 | Schuermann et al. ................. | 219/110 |
| 5,844,193 | 12/1998 | Nomura et al. ........................ | 219/110 |

*Primary Examiner*—Clifford C. Shaw
*Attorney, Agent, or Firm*—Wenderoth, Lind & Ponack, L.L.P.

[57] ABSTRACT

When each weld period starts, a control feeds e.g., a high-level ON signal to switching elements having the associated polarity of an inverter so that the switching elements go on and remain on (step S2). This allows the current to start to flow and rise with a sharp gradient on the primary and secondary sides of a welding transformer. When a current detection signal <$I_1$> from a sensor reaches a preset current value $I_F$ for current build-up in that weld period (steps S3 and S4), the control stops the on signal and instead issues a PWM signal to provide a high-frequency (e.g., 10 kHz) switching control of the switching elements (steps S5 to S9).

5 Claims, 5 Drawing Sheets

FIG.6

RESISTANCE WELDING CONTROL APPARATUS

BACKGROUND OF THE INVENTION

1. Field of the Invention

The present invention relates to a resistance welding control apparatus for carrying out inverter-controlled AC resistance welding.

2. Description of the Related Arts

In an inverter-controlled AC resistance welding, the primary coil of a welding transformer is connected to the output terminal of an inverter, while the secondary coil thereof is connected directly (without interposition of a rectifying circuit) to a pair of welding electrodes. The inverter comprises positive side switching elements and negative side switching elements, of which polarities correspond to current polarities. The inverter receives a DC power, acquired by rectifying a commercial frequency, from a rectifying circuit and is controlled by an inverter control circuit.

For each weld period $T_A$ corresponding to half cycle $T_W/2$ of a cycle $T_W$ which is defined for the secondary alternating welding current, the inverter control circuit alternately provides a switching control, with a high frequency, to the positive side switching elements and negative side switching elements of the inverter. More specifically, during the weld period $T_A$ corresponding to the positive half cycle of the alternating welding current, the positive side switching elements are switching with a high frequency, e.g., 10 kHz, with the negative side switching elements remaining off, whereas during the weld period $T_A$ corresponding to the negative half cycle of the alternating welding current, the negative side switching elements are switching with the same high frequency (10 kHz), with the positive switching elements remaining off.

Figure 5A:
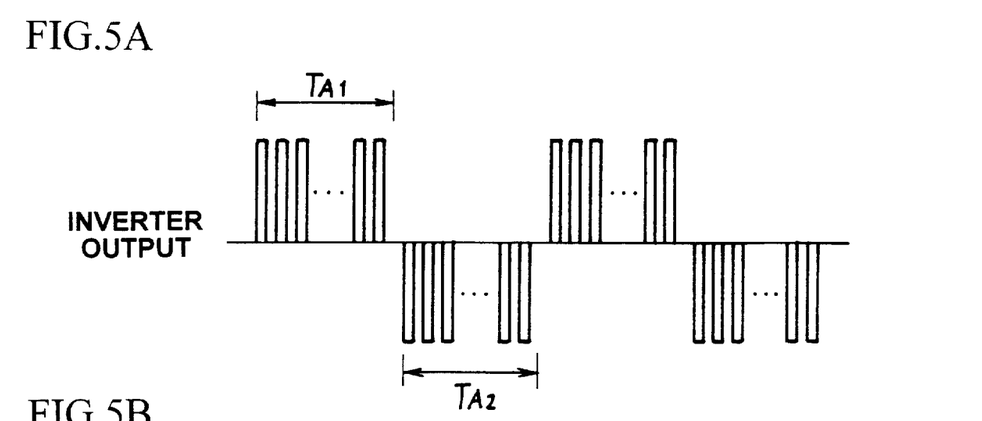
FIGS. 5A and 5B are waveform diagrams for explaining an inverter-controlled AC resistance welding.
Figure 5B:
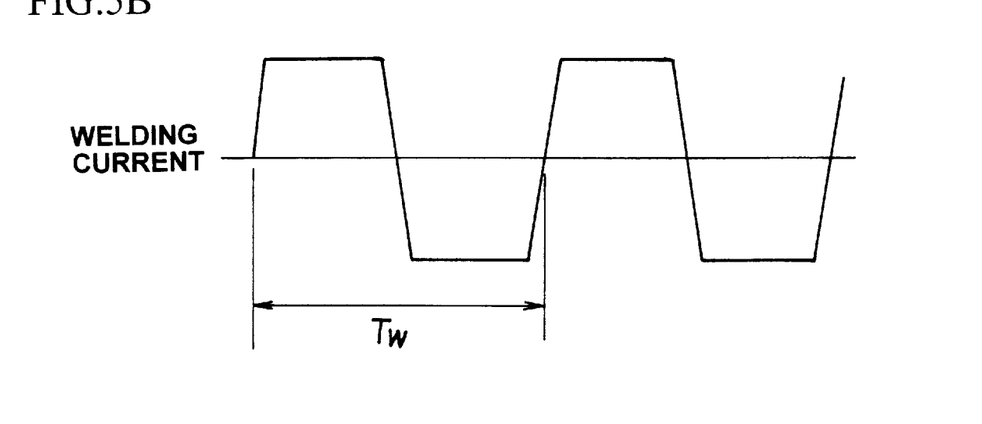

Thus, as shown in FIGS. 5A and 5B, the primary coil of the welding transformer is supplied via the output terminal of the inverter with a high frequency pulse whose polarity is inverted at every weld period $T_A$, while in the secondary circuit of the welding transformer the alternating welding current with a frequency $T_W$ flows through a pair of welding electrodes into materials to be welded, subjecting the welding areas of the materials to the resistance welding.

Such an inverter-controlled AC resistance welding makes use of a low frequency corresponding to the commercial frequency in order to switch the polarity of the welding current, so that it is applicable to the welding head (including the welding transformer and secondary circuit) common to the ordinary low frequency AC of the thyristor-controlled system. In addition, the ratio of the effective weld time is remarkably larger than the ratio of the non-weld time at all times as compared with the thyristor-controlled system, thereby ensuring a stable resistance welding with a higher heat generation efficiency and less spatter.

Figure 6:
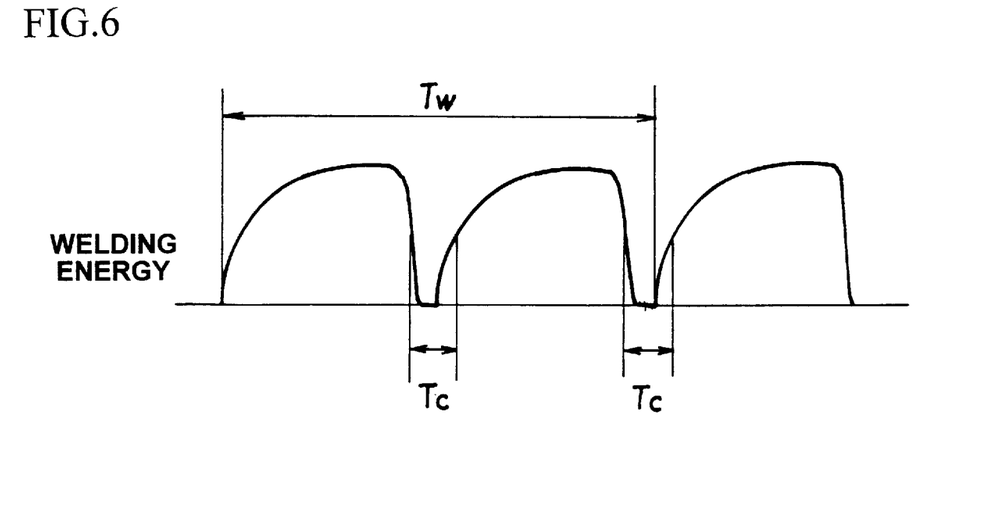
FIG. 6 diagrammatically shows a waveform of a welding energy supplied to materials to be welded in the inverter-controlled AC resistance welding.

Nevertheless, the inverter-controlled AC welding poses a problem that the supply of the welding energy is temporarily interrupted upon the polarity switching as shown in FIG. 6, which may affect the weld quality. To obtain a high weld quality, it is demanded to minimize the interruption (dip) of the welding energy upon the polarity switching to thereby enhance the heat generation efficiency and reduce the weld time.

In this respect, the conventional resistance welding control apparatus of this type employs a high-frequency switching of the switching elements on the associated polarity side from the beginning of each weld period $T_A$ to the end thereof. It is however difficult for such a switching control to minimize the interruption (dip) of the welding energy since it takes time to build up the current to the preset value immediately after the beginning of each weld period.

In the case of the resistance welding allowing a flow of large welding current (e.g., 8000 A or more) in particular, the current build-up characteristics will have a significant effect on the heat generation efficiency of the entire welding current supply, since the current supplying cycle count, i.e., the number of weld periods is large with the build-up of the current being iterated many times.

SUMMARY OF THE INVENTION

The present invention was conceived in view of the above problems involved in the prior art. It is therefore the object of the present invention to provide a resistance welding control apparatus capable of shortening the interruption of the welding energy upon the polarity switching in the inverter-controlled AC resistance welding, to enhance the heat generation efficiency, thereby achieving a reduction in the weld time and an improvement in the weld quality.

In order to attain the above object, according to the present invention, there is provided a resistance welding control apparatus for carrying out a resistance welding of materials to be welded by means of a secondary voltage at a welding transformer, supplied via a welding electrode to the materials without rectifying the secondary voltage, the apparatus comprising a rectifying circuit for converting therethrough alternating current with a commercial frequency into direct current; an inverter whose input terminal is electrically connected to an output terminal of the rectifying circuit and whose output terminal is electrically connected to a primary terminal of the welding transformer; weld sequence control means for controlling the inverter in such a manner that, of a plurality of weld periods constituting a weld time for a single resistance welding, during odd-numbered weld periods the current supply is effected with a first polarity whereas during even-numbered weld periods the current supply is effected with a second polarity which is an opposite polarity to the first polarity; current detection means for detecting a current on the primary or secondary of the welding transformer, to issue a current detection signal indicative of a value of the current detected; current build-up control means for building up the current via the inverter being kept on in a substantially continuous manner with the first polarity or the second polarity until the current detection signal reaches a predetermined set current value after the start of current supply in each of the weld periods; and switching control means for continuously providing a switching control at a predetermined high frequency with the first polarity or the second polarity till the termination of current supply after the current has reached the set current value.

In the resistance welding control apparatus, the weld sequence control means may include current monitoring means for monitoring the current on the basis of a current detection signal from the current detection means immediately after the termination of each weld period, the current monitoring means detecting a timing at which the current has reached a predetermined monitoring value; and weld starting control means for starting the next weld period in response to the timing detected by the current monitoring means.

In the resistance welding control apparatus, the current build-up control means may include current setting means for individually defining the set current value for each weld period.

In the resistance welding control apparatus, the current build-up control means preferably include current setting means for defining the set current value for each weld period in such a manner that during an initial predetermined number of the weld periods the set current value gradually increases but that during the subsequent weld periods the set current value is kept constant.

In the resistance welding control apparatus, the switching control means preferably include current measurement means for acquiring a current measurement value indicative of an effective value or a mean value of the current for each switching cycle on the basis of a current detection signal from the current detection means; and pulse width control means for comparing the current measurement value from the current measurement means with a set current value for constant current control, to determine a pulse width of an output pulse from the inverter in the next switching cycle in response to a comparison error.

According to the resistance welding control apparatus of the present invention, the inverter has been kept in substantially on-state immediately after the start of current supply in each weld period so as to allow a rapid build-up of current in the inverter-controlled AC resistance welding, whereby it is possible to reduce the interruption of the welding energy upon the switching of polarity to enhance the heat generation efficiency, thereby realizing a reduction in the weld time and an improvement in the weld quality.

BRIEF DESCRIPTION OF THE DRAWINGS

The above and other objects, aspects, features and advantages of the present invention will become more apparent from the following detailed description with reference to the accompanying drawings, in which.

DESCRIPTION OF THE PREFERRED EMBODIMENTS

Reference will now be made to FIGS. 1 to 4 which illustrate preferred embodiments of the present invention in a non-limitative manner.

Figure 1:
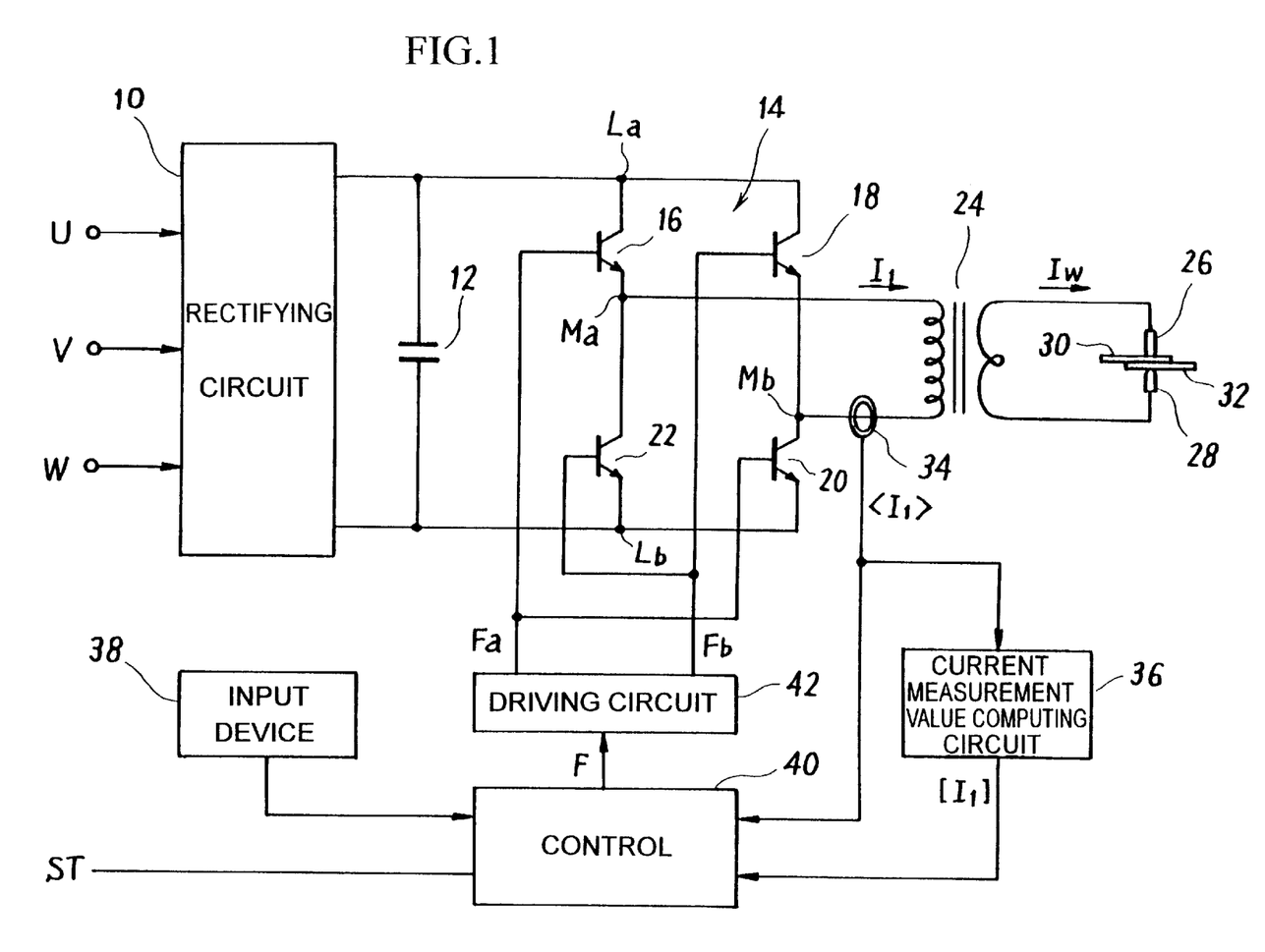
FIG. 1 is a diagram showing a circuit configuration of a resistance welding control apparatus in accordance with an embodiment of the present invention.

FIG. 1 shows a circuit configuration of a resistance welding control apparatus in accordance with an embodiment of the present invention. An inverter 14 in the resistance welding control apparatus comprises four transistor switching elements 16, 18, 20 and 22 in the form of, e.g., GTRs (giant transistors) or IGBTs (insulated gate bipolar transistors).

Of the four switching elements 16 to 22, a first set of switching elements (positive side) 16 and 20 are simultaneously on-off controlled by a first inverter control signal Fa from a driving circuit 42 whereas a second set of switching elements (negative side) 18 and 22 are simultaneously on-off controlled by a second inverter control signal Fb from the driving circuit 42.

The inverter 14 has input terminals (La, Lb) connected to output terminals of a rectifying circuit 10, and output terminals (Ma, Mb) connected to both ends of the primary coil of a welding transformer 24. A pair of welding electrodes 26 and 28 are connected directly (i.e., without interposition of any rectifying circuit) to opposite ends of the secondary coil of the welding transformer 24. The pair of welding electrodes 26 and 28 butt against materials 30 and 32 to be welded in a manner apart from (e.g., confronting) each other and come into pressure contact with the same under a pressure from a pressurizing mechanism not shown.

The rectifying circuit 10 is in the form of a three-phase rectifying circuit consisting of, e.g., six diodes in three-phase bridge connection and converts a three-phase AC voltage with a commercial frequency from a three-phase AC power supply terminal (U, V, W) into a DC voltage. The DC voltage output from the rectifying circuit 10 is fed via a smoothing capacitor 12 to the inverter 14.

A current sensor 34 in the form of, e.g., a current transformer is fitted to a conductor extending between the output terminal of the inverter 14 and the primary coil of the welding transformer 24. During the current supply for welding, the current sensor 34 provides as its output a current detection signal $<I_1>$ indicative of an instantaneous value of a current $I_1$ on the primary side having a waveform similar to that of a welding current $I_W$ on the secondary side. The current detection signal $<I_1>$ from the current sensor 34 is fed both to a control 40 and a current measurement value computing circuit 36.

The current measurement value computing circuit 36 computes an effective value or a mean value of the primary current $I_1$ as a current measurement value $[I_1]$ on the basis of the current detection signal $<I_1>$ from the current sensor 3D at every switching cycle, and feeds the thus computed current measurement value $[I_1]$ to the control 40.

The control 40 is comprised of a microcomputer, which includes a CPU, a ROM (program memory), a RAM (data memory), a clock circuit, an interface circuit, etc., and which provides all controls within the apparatus, such as current control and sequential control in the control apparatus, setting/ entry and registration management related to set values of various welding conditions, in addition, output control of measurement values, judgment values and the like. The current control includes current build-up control in accordance with this embodiment described later and feedback constant current control. The sequential control includes current monitoring control and weld start control in accordance with this embodiment which will be described later.

An input device 38 is comprised of an input device such as a keyboard or a mouse and is used for the setting and entry of the various welding conditions. Major welding conditions to be set and entered in this embodiment are a weld time $T_G$, a weld period $T_A$, a set current value $I_F$ for current build-up, a set current value $I_C$ for constant current control, a current monitoring value $I_K$ for the start of weld, a pulse width initial value $D_0$, etc.

Of these welding conditions, the weld time $T_G$ is an entire weld time from the start of welding current supply to the end thereof and can be set as an integer multiplying the base cycle representative of the current supplying period $T_A$, i.e., a half cycle, or as the number of cycles representative of the half cycle multiplied by an even number. The weld period $T_A$ is a single independent weld period, during which the inverter 14 performs a switching action in a continuously manner on the positive side or negative side, and it can be for example a period corresponding to a half cycle of the commercial frequency (50 Hz or 60 Hz).

The set current value $I_F$ for current build-up is a target value upon the build-up of current under the current build-up control immediately after the start of each weld period $T_A$, and it may be set to an individual value for each weld period $T_A$ or alternatively to a certain value common to all the periods.

The set current value $I_C$ for constant current control is a reference value which is used when the constant current control is provided after the current build-up in each weld period $T_A$, and it is defined for each weld period $T_A$. In each weld period $Y_A$, the set current value $I_F$ for current build-up and the set current value $I_C$ for constant current control can ordinarily be set to the same value. However, both the set current values $I_F$ and $I_C$ may be set to different values. For example, to prevent any overshoot upon the build-up, $I_F$ may be set to a slightly smaller value than $I_C$.

Since large-scale resistance welding machines need a considerable time to reach a set large current value, both the set current value $I_F$ for current build-up and the set current value $I_C$ for constant current control may gradually be increased in an up-slope during a predetermined number of weld periods after the start of welding current supply, but both the set current values $I_F$ and $I_C$ may be set to certain values (constant values) in the subsequent weld periods.

The current monitoring value $I_K$ indicates a welding condition for obtaining an optimum timing of the start of current supply in each of the second and subsequent weld periods $T_A$, and it is usually set to a value in the vicinity of the 0A (ampere). The pulse width initial value $D_0$ is an initial value for defining an initially supplied pulse width in the pulse width control for each weld period $T_A$.

It is to be noted that other peripheral units such as a display and a printer are also connected to the control 40.

Figure 2:
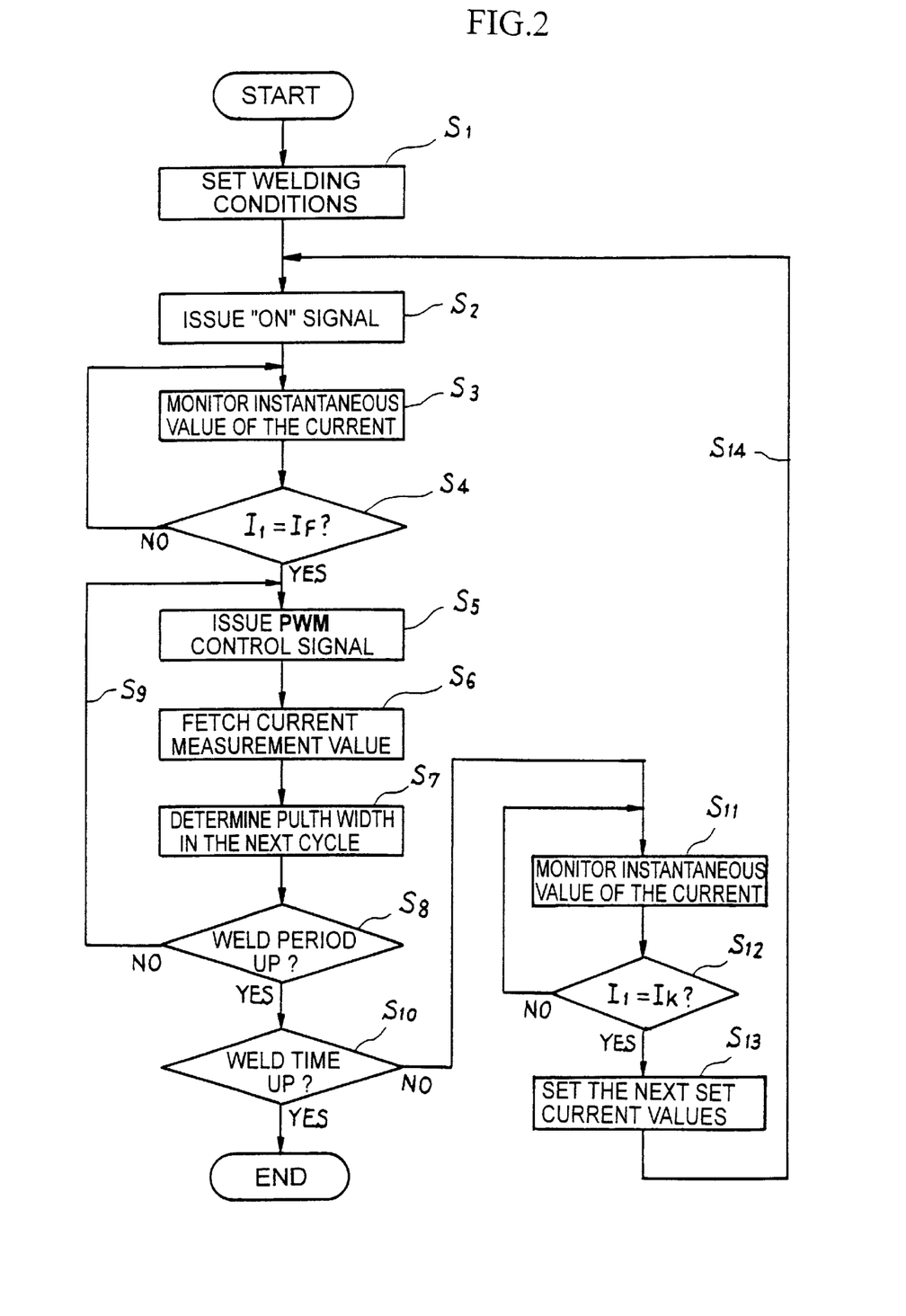
FIG. 2 is a flowchart showing the processing action of a control for the welding current supply in the embodiment.
Figure 3:
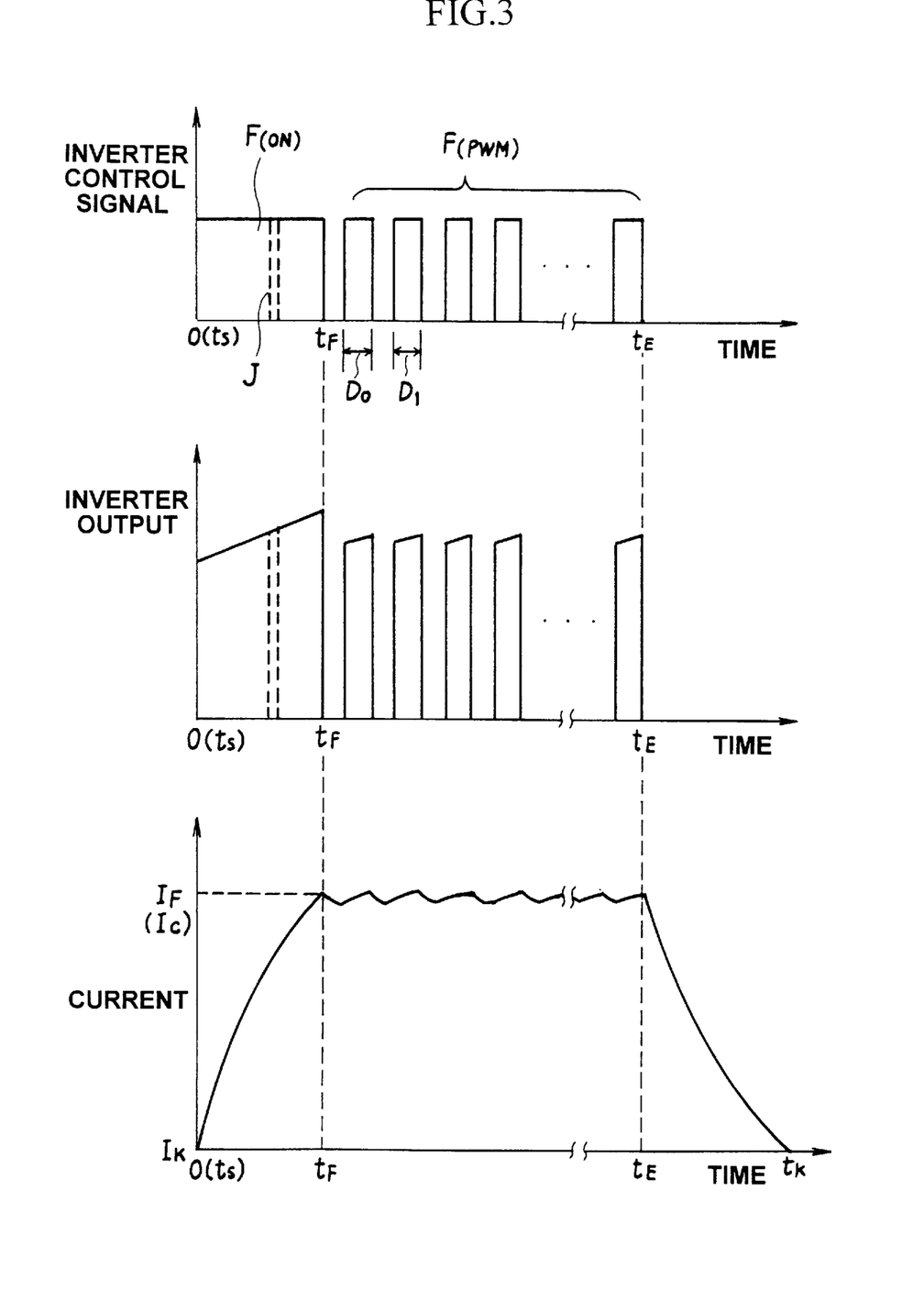
FIG. 3 are waveform diagrams each showing a waveform of each part in a single weld period of the welding current supply of the embodiment.
Figure 4A:
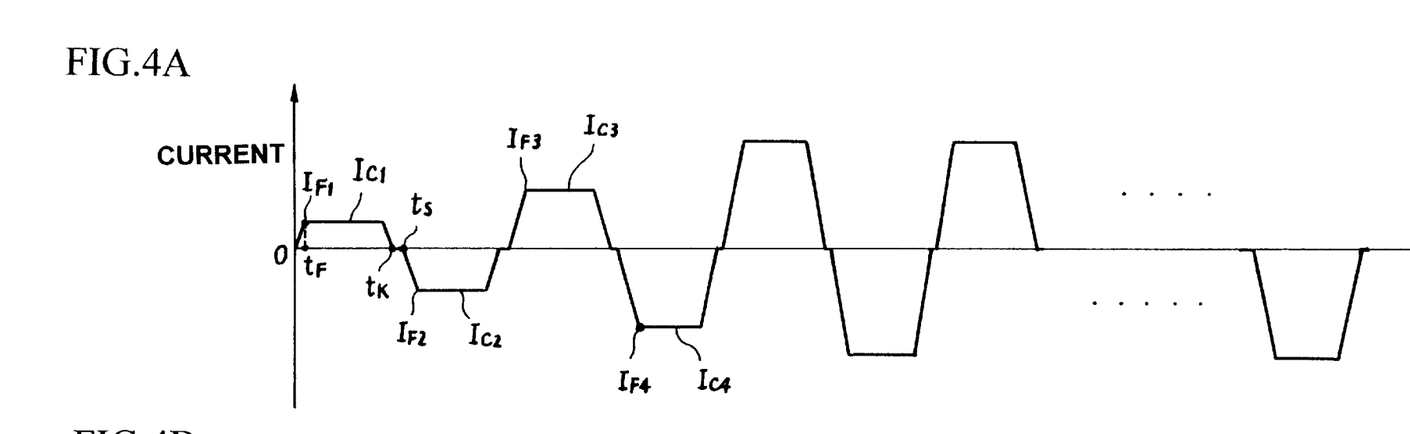
FIGS. 4A and 4B are waveform diagrams showing waveforms of current and welding power, respectively, over the entire weld time of the welding current supply of the embodiment.
Figure 4B:
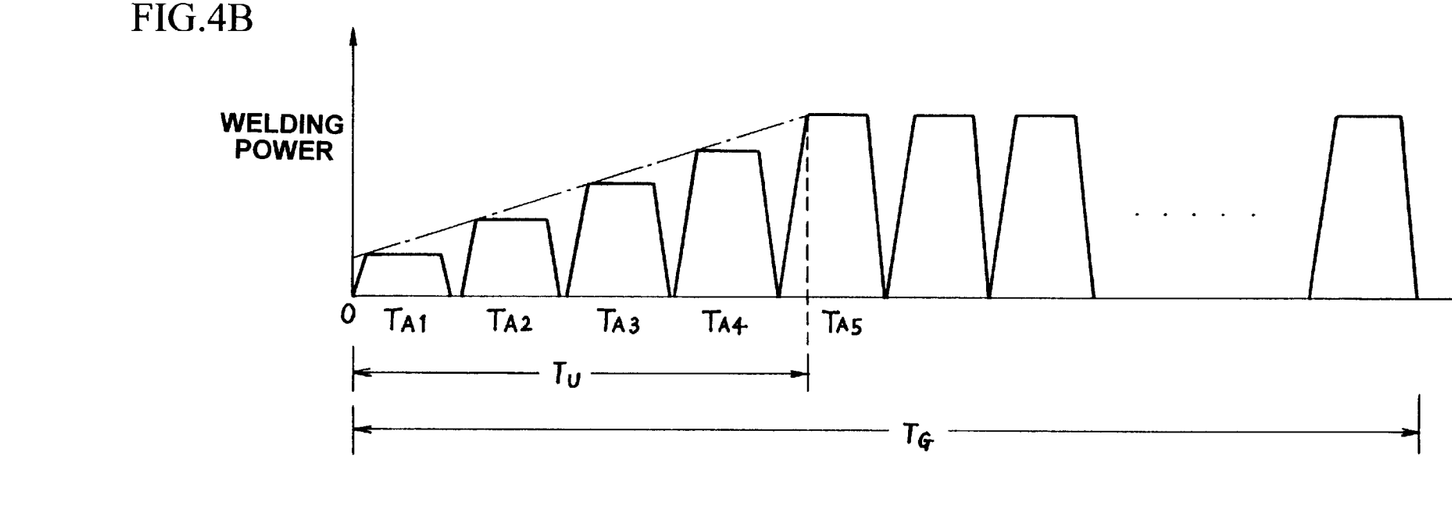

The function of this embodiment is then described with reference to FIGS. 2 to 4. FIG. 2 is a flowchart showing the processing action of the control 40 (especially the CPU) for the welding current supply. FIG. 3 each shows a waveform of each part in a single weld period, and FIGS. 4A and 4B show waveforms of the welding current and welding power, respectively, in case the weld period consists of the larger number of cycles.

In response to a start signal ST issued from an external device (not shown) such as a welding robot in the condition that the welding electrodes 26 and 28 are in pressure contact with the materials 30 and 32 to be welded under a predetermined pressure from the pressurizing mechanism, the control 40 starts to supply the welding current. At that time, the start signal ST may be arranged to not merely indicate the start of the welding current supply but also specify the condition No. or the schedule No. of this welding current supply.

First, from the memory the control 40 reads various set value data related to this welding current supply, such as the weld time $T_G$, weld period $T_A$, current set values (set current value $I_F$ for current build-up and set current value $I_C$ for constant current control for each weld period), current monitoring value $I_K$ and pulse width initial value $D_0$, and sets them into predetermined storage addresses, or registers and timers or counters (Step S1).

Then the control 40 starts the first weld period $T_A$ and issues the first inverter control signal Fa in the form of, e.g., a high-level ON signal $F_{(ON)}$, with the second inverter control signal Fb turned off (step S2).

The ON signal $F_{(ON)}$ is fed via the driving circuit 42 to the switching elements 16 and 20 on the positive side, causing the switching elements 16 and 20 to go on into condition state. This allows a positive primary current $I_1$ and secondary current (welding current) $I_W$ to start to flow through the primary circuit and secondary circuit, respectively, of the welding transformer 24.

While issuing the above ON signal $F_{(ON)}$, the control 40 fetches a current detection signal <$I_1$> from the current sensor 34 (step S3), and compares an instantaneous value of the primary current $I_1$ with a set current value $I_{F1}$ for current build-up in the first weld period $T_{A1}$ (step S4).

Since the switching elements 16 and 20 on the positive side keep the on-state, the inverter 14 keeps the short-circuited state, allowing the current $I_1$ ($I_W$) to rapidly build up.

Then, at the time ($t_F$) when the primary current $I_1$ has reached the set current value $I_{F1}$ in the first weld period $T_{A1}$, the control 40 stops the issue of the above on signal $F_{(ON)}$ and switches the first inverter control signal Fa into a PWM signal $F_{(PWM)}$ with a high frequency, e.g., 10 kHz (step S5).

In this pulse width control, both the switching elements 16 and 20 on the positive side are first switched on with the initial pulse width $D_0$. When the welding current $I_W$ and the primary current $I_1$ flow through the secondary circuit and primary circuit of the welding transformer 24, respectively, in this first switching cycle, the current measurement value computing circuit 36 gives a current measurement value (effective value or mean value) [$I_1$] of the primary current $I_1$ in this switching cycle.

The control 40 fetches the current measurement value [$I_1$] from the current measurement value computing circuit 36 (step S6) and compares this current measurement value [$I_1$] with a current set value [$I_C$] for constant current control in the first weld period $T_{A1}$, to determine the pulse width (switching on time) $D_1$ in the next switching cycle on the basis of the comparison error (step S7).

Then, in the second switching cycle, the control 40 issues a PWM signal $F_{(PWM)}$ with a pulse width $D_1$, allowing the switching elements 16 and 20 on the positive side to switch on for the duration equal to the pulse width $D_1$ (steps S9 and S5).

Subsequently, till the termination of the first weld period $T_{A1}$, only the positive side switching elements 16 and 20 of the switching means 14 are continuously switched with the high frequency (10 kHz) under the above described feedback pulse width control (steps S5 to S9). For this duration, the negative side switching elements 18 and 22 are kept in the OFF state. This allows a current $I_1$ ($I_W$) substantially equal to the set current value $I_{C1}$ for constant current control in the first weld period $T_{A1}$ to flow through the primary circuit and secondary circuit of the welding transformer 24 in the positive direction.

When the first weld period $T_{A1}$ terminates at a predetermined time $t_E$ (step S8), the control 40 stops the feed of the PWM signal $F_{(PWM)}$ to the positive side switching elements 16 and 20 and also stops the fetch of the current measurement value [$I_1$] from the current measurement value computing circuit 36. Instead, the control 40 fetches the current detection signal <$I_1$> from the current sensor 34, to monitor the instantaneous value of the primary current $I_1$ or the welding current $I_W$ (step S11). During this monitoring period, the current $I_1$ ($I_W$) falls with a time constant depending on the inductance of the resistance welding machine or load impedance.

Then, when a timing $t_K$ is detected at which the current $I_1$ ($I_W$) has fallen to the current monitoring value $I_K$ (step S12), the control 40 immediately terminates the monitoring period or the halt period, and performs switching to the next set current values ($I_{F2}$, $I_{C2}$) (Step S13) to start the second weld period $T_{A2}$ on the negative side (step S14).

When the second weld period $T_{A2}$ starts, the control 40 issues a second inverter control signal Fb in the form of a high-level ON signal $F_{(ON)}$, with the first inverter control signal Fa turned off (step S2). This ON signal $F_{(ON)}$ causes the switching elements 18 and 22 on the negative side in the inverter to go on and remain on. This in turn allows a current $I_1$ ($I_W$) in the negative direction to start flowing and rise with a sharp gradient.

When the current detection signal <$I_1$> from the current sensor 34 reaches a set current value $I_{F2}$ for current build-up in the second weld period $T_{A2}$ (step S4), the control 40 switches the second inverter control signal Fb from the ON signal $F_{(ON)}$ to a PWM signal $F_{(PWM)}$ with a high frequency (10 kHz) in the same manner as the above (step S5).

Subsequently, till the termination of the second weld period $T_{A2}$, only the negative side switching elements 18 and 22 of the switching means 14 are continuously switched at a high frequency (10 kHz) under the feedback pulse width control (steps S5 to S9). For this duration, the positive side switching elements 16 and 20 are kept in the off state. This allows a current $I_1$ ($I_W$) substantially equal to a set current value $I_{C2}$ for constant current control to flow through the primary circuit and the secondary circuit of the welding transformer 24 in the negative direction.

When the second weld period $T_{A2}$ terminates (step S8), the control 40 stops the feed of the PWM signal $F_{(PWM)}$ to the negative switching elements 18 and 22, while simultaneously stopping the fetch of the current measurement value [$I_1$] from the current measurement value computing circuit 36. Instead, the control 40 fetches a current detection signal <$I_1$> from the current sensor 34, to monitor the fall of the primary current $I_1$ or the welding current $I_W$ (step S10).

Then, when the current $I_1$ ($I_W$) reaches the current monitoring value $I_K$ (step S12), the control 40 terminates the monitoring period or the halt period and performs switching to the next set current values ($I_{F3}$, $I_{C3}$) (step S13), to start a third weld period $T_{A3}$ on the positive side (step S14).

In this manner, the weld periods $T_A$ are iterated alternately between the positive side and the negative side, and when the ending time of the weld time $T_G$ is reached, the weld control action is complete (step S10). Since the weld time $T_G$ is defined as the number of cycles representative of the weld period $T_A$ multiplied by the even number in this embodiment, the welding current supply is terminated at the point of time when the counter for the weld time setting has counted up a preset value.

It is to be appreciated that in the case where the weld time consists of a larger number of weld periods as shown in FIGS. 4A and 4B, the current $I_1$ ($I_W$) or the welding power increases with up-slope during a predetermined number of, e.g., five weld periods $T_{A1}$ to $T_{A5}$ after the start of the current supply, with the current being kept at a certain value (constant value) during the subsequent weld periods $T_{A5}$, $T_{A6}$, etc.

In the resistance welding control apparatus of this embodiment, in this manner, the inverter 14 supplys current on the positive side during the odd-numbered weld periods $T_{A1}$, $T_{A3}$, $T_{A5}$, etc., allowing the current $I_1$ ($I_W$) to flow in the positive direction, whereas the inverter 14 supplys with current on the negative side during the even-numbered weld periods $T_{A2}$, $T_{A4}$, $T_{A6}$, etc., allowing the current $I_1$ ($I_W$) to flow in the negative direction. Within each weld period $T_A$, the switching elements 16 and 20 (or 18 and 22) on the associated polarity side are continuously kept in the ON state immediately after the start of the current supply, with the current $I_1$ ($I_W$) being rapidly built up to a predetermined set current value $I_F$, after which switching is made to the feedback pulse width control to provide a high-frequency switching control of those switching elements 16 and 20 (or 18 and 22), allowing the current $I_1$ ($I_W$) to flow to coincide with the set current value $I_C$.

By virtue of the above described current build-up control, it is possible to narrow the interruption (dip) of resistance heat generation or of the welding energy upon the switching of polarity, to enhance the heat generating efficiency and shorten the weld time, ensuring a higher weld quality.

Moreover, in this embodiment, upon the switching from each weld period $T_{Ai}$ to the next weld period $T_{A(i+1)}$, the switching action of the inverter 14 is stopped after the termination of the weld period $T_{Ai}$ to monitor the fall of the current $I_1$ ($I_W$) so that the next weld period $T_{A(i+1)}$ is started immediately after the current $I_1$ ($I_W$) has reached a predetermined monitoring value $I_K$.

By virtue of such a weld start control, the interruption (dip) of the welding energy upon the switching of polarity can be made as narrow as possible while preventing any short-circuit breakdown of the switching means 16 to 22, to further promote the improvement in the heat generating efficiency as well as the reduction in the weld time, thereby realizing a further improvement in the weld quality.

In cases where the weld time consists of a larger number of weld periods in particular as shown in FIGS. 4A and 4B, the switching of polarity and the build-up of current are iterated many times, so that the interruption time reducing effect in accordance with the present invention is significant, making it possible to enhance the heat generating efficiency of the welding current to shorten the up-slope time $T_U$, thereby achieving a remarkable reduction in the entire weld time $T_G$.

Although the preferred embodiment of the present invention has been described hereinabove, the present invention is not intended to be limited to the above embodiment, but it could be variously modified or altered within the scope of its technical idea.

For example, in the current build-up control in the above embodiment the ON signal $F_{(ON)}$ was completely kept at high level so that the inverter 14 was kept in the ON state continuously on the positive or negative side. But instead, as shown in dotted lines J in FIG. 3 for example, the ON signal $F_{(ON)}$ might be momentarily switched to low level in midcourse to momentarily stop the inverter 14, since the ON state is kept in a substantially continuous manner, whereby the same build-up characteristic as the above could be obtained.

Furthermore, by detecting the timing at which the current in the most recent weld period has fallen to a predetermined monitoring value $I_K$ in the weld start control in accordance with the above embodiment, it is possible to start the current supply in the next weld period at an optimum timing. Although it is inferior to such a weld start control method, another weld start control method is also feasible in which the current supply in the next weld period is started at the point of time when a certain halt period has elapsed after the ending time $t_E$ of the most recent weld period.

Although of the plurality of weld periods constituting the weld time in the above embodiment the odd-numbered periods were on the positive side with the even-numbered ones on the negative side, it is also possible to the contrary to put the odd-numbered periods on the negative side with the even-numbered ones on the positive side. Furthermore, the weld time could be defined by time (seconds) instead of the integer myltipying the weld period. It is also possible to stop a desired (e.g., the last) weld period in mid-course as needed or to differently define the length of each weld period or to variably control it.

Although in the above embodiment the three-phase alternating current with a commercial frequency was converted into direct current and fed to the switching means 14, a single-phase alternating current with a commercial frequency may be converted into direct current. The circuit configuration of the inverter 14 is also provided merely by way of example and various modifications would be possible. Furthermore, the current sensor 34 was provided on the primary circuit in the above embodiment, but instead it might be provided on the secondary circuit.

The above embodiment has employed the pulse width control for the constant current control in each weld period. However, it is also possible to employ a current peak value (limiter) control method in which an instantaneous value or a waveform of the primary or secondary side current is detected for each cycle of the inverter frequency, with the inverter being switched off at the point of time when the current instantaneous value has reached a predetermined peak value (limiter value).

The resistance welding control apparatus of the present invention enables the weld period and the weld time to be set to any values, and it is also applicable to welding of small parts or the like in which a single positive side weld period is merely followed by a single negative side weld period.

The invention is not limited to the embodiment described and shown. Various other modification can be made within the scope of the invention.

What is claimed is:

1. A resistance welding control apparatus for carrying out a resistance welding of materials to be welded by means of a secondary voltage at a welding transformer, supplied via a welding electrode to said materials without rectifying said secondary voltage, said apparatus comprising:

a rectifying circuit for converting therethrough alternating current with a commercial frequency into direct current;

an inverter whose input terminal is electrically connected to an output terminal of said rectifying circuit and whose output terminal is electrically connected to a terminal on the primary side of said welding transformer;

weld sequence control means for controlling said inverter in such a manner that, of a plurality of weld periods constituting a weld time for a single resistance welding, during odd numbered weld periods the current supply is effected with a first polarity whereas during even numbered weld periods the current supply is effected with a second polarity which is an opposite polarity to said first polarity;

current detection means for detecting a current on the primary or secondary side of said welding transformer, to issue a current detection signal indicative of a value of said current detected;

current build-up control means for building up said current via said inverter being kept on in a substantially continuous manner with said first polarity or said second polarity until said current detection signal reaches a predetermined set current value after the start of current supply in each of said weld periods; and switching control means for continuously providing a switching control at a predetermined high frequency with said first polarity or said second polarity till the termination of current supply after said current has reached said set current value.

2. A resistance welding control apparatus according to claim 1, wherein said weld sequence control means include current monitoring means for monitoring said current on the basis of a current detection signal from said current detection means immediately after the termination of each weld period, said current monitoring means detecting a timing at which said current has reached a predetermined monitoring value; and weld starting control means for starting next said weld period in response to said timing detected by said current monitoring means.

3. A resistance welding control apparatus according to claim 1, wherein said current build-up control means include current setting means for individually defining said set current value for each weld period.

4. A resistance welding control apparatus according to claim 1, wherein said current build-up control means include current setting means for defining said set current value for each weld period in such a manner that during an initial predetermined number of said weld periods said set current value gradually increases but that during subsequent said weld periods said set current value is kept constant.

5. A resistance welding control apparatus according to claim 1, wherein said switching control means include current measurement means for computing a current measurement value indicative of an effective value or a mean value of said current for each switching cycle on the basis of a current detection signal from said current detection means; and pulse width control means for comparing said current measurement value from said current measurement means with a set current value for constant current control, to determine a pulse width of an output pulse from said inverter in the next switching cycle in response to a comparison error.

* * * * *